United States Patent
Cheng et al.

(10) Patent No.: US 6,751,039 B1
(45) Date of Patent: Jun. 15, 2004

(54) METHOD AND APPARATUS FOR SETTING MAGNETO RESISTIVE HEAD BIAS CURRENT IN DISK DRIVE FOR DESIRED HEAD LIFETIME

(75) Inventors: Nelson Shih-Cheng Cheng, Fremont, CA (US); Caleb Kai-Lo Chang, Sunnyvale, CA (US); Steven Lambert, San Jose, CA (US); Tue Thanh Ngo, Milpitas, CA (US)

(73) Assignee: Maxtor Corporation, Longmont, CO (US)

( * ) Notice: Subject to any disclaimer, the term of this patent is extended or adjusted under 35 U.S.C. 154(b) by 424 days.

(21) Appl. No.: 10/008,317

(22) Filed: Nov. 3, 2001

(51) Int. Cl.⁷ .............................................. G11B 5/03
(52) U.S. Cl. ........................................ 360/66; 360/31
(58) Field of Search ............................ 360/31, 66, 313, 360/63; 324/210, 212, 226

(56) References Cited

U.S. PATENT DOCUMENTS 5,790,334 A * 8/1998 Cunningham ............ 360/66
5,978,163 A * 11/1999 Cunningham ............ 360/66

\* cited by examiner

Primary Examiner—Alan T. Faber

(57) ABSTRACT

A method of controlling bias supply sources for magneto-resistive transducer (MR) heads to provide essentially the same predetermined lifetime for the MR heads, by determining dependence of head lifetime on bias supply level and on head stripe temperature, and setting a bias supply level for each head based on said dependence of lifetime on bias supply level and on head temperature, to provide essentially the same predetermined lifetime for the heads.

47 Claims, 4 Drawing Sheets

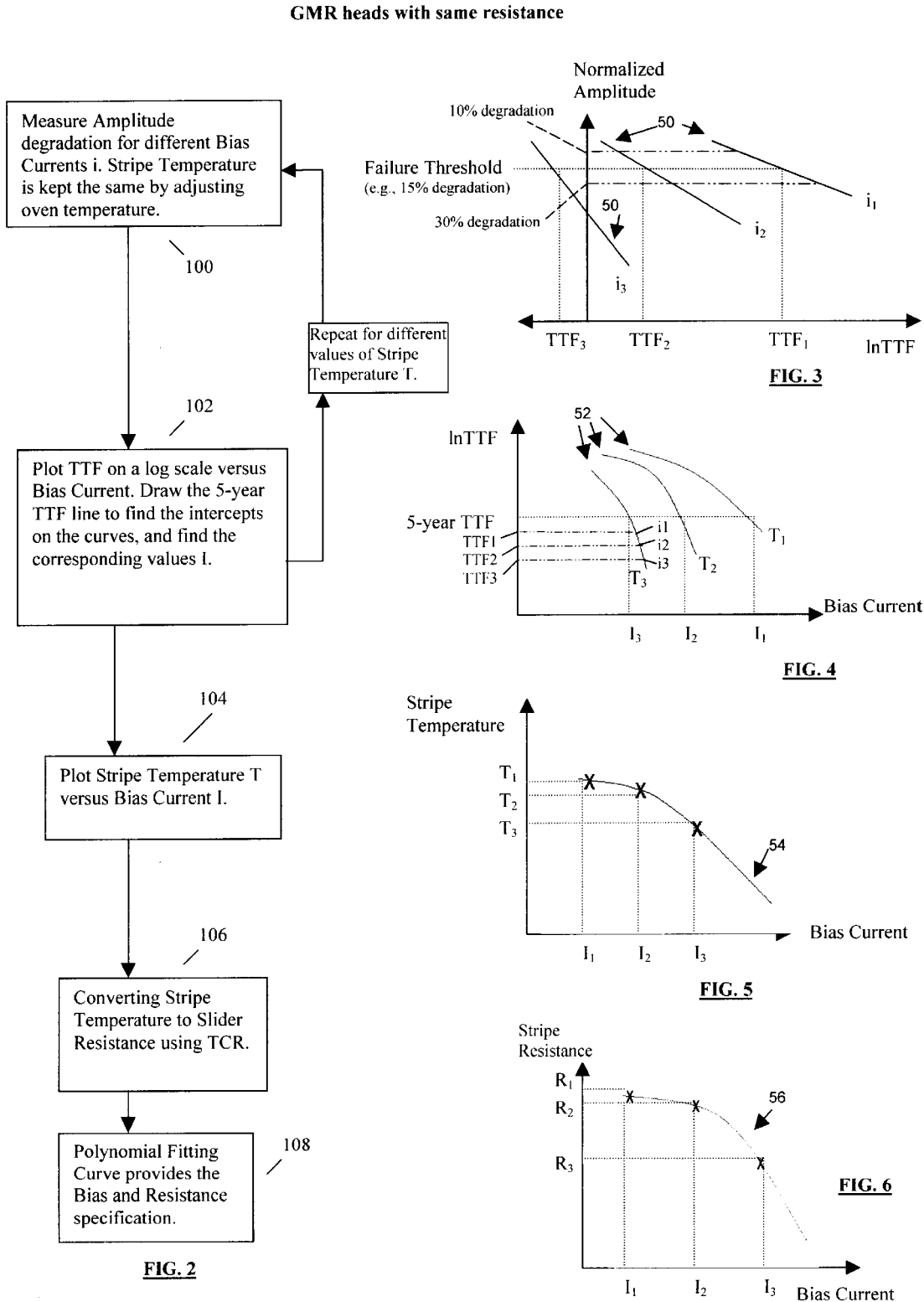

GMR heads with same resistance

METHOD AND APPARATUS FOR SETTING MAGNETO RESISTIVE HEAD BIAS CURRENT IN DISK DRIVE FOR DESIRED HEAD LIFETIME

FIELD OF THE INVENTION

The present invention relates generally to extending transducer head lifetime, an in particular to setting GMR head bias current in disk drives to ensure adequate GMR head lifetime.

BACKGROUND OF THE INVENTION

Many disk drives utilize giant magneto resistive (GMR) transducer heads for recording data to, and reading data from, magnetic media on data disks. The GMR head performance and lifetime is a function of the temperature of the head. The readback signal amplitude degradation in GMR heads is a function of age or stress in the heads. As recording density increases steadily, readback signal amplitude degradation in GMR heads becomes a very serious drawback.

Further, to meet signal to noise ratio requirements for higher density recording and readback, it is desirable to provide either higher GMR sensitivity (to offset the GMR signal degradation due to reduction of track width shrinkage in higher density recording), or a shorter stripe in the heads to maintain head sensor aspect ratio. Because developing higher sensitivity GMR requires tremendous effort and time to develop, for practical reasons, conventionally the GMR sensor stripe height is shortened to keep up with recording density increases.

The bias current density in the stripe film increases accordingly with the stripe height reduction. Historically as recording density increases steadily, the current density in the sensor has increased from low $10^6$ A/cm$^2$ in early GMR programs to about $4 \times 10^8$ A/cm$^2$, (in the Cu spacer layer) in the recent GMR designs. However, when the current density in the sensor stripe increases, anti-ferromagnet (AFM) de-pinning and interlayer diffusion become more severe due to the accompanied stripe temperature increase. In addition to temperature increase, electromigration and AFM de-magnetization caused by increased current density contribute significantly to amplitude degradation. For example, at stripe temperature of 168 C., a 14% amplitude loss is observed in GMR heads stressed by a 4.5 mA bias current, and a 41% amplitude loss is observed in GMR heads stressed by a 5.0 mA bias current.

Conventionally, the head bias current is adjusted based on temperature for optimizing head performance and GMR lifetime in disk drives. The value of the bias current used in disk drives is determined by the GMR sensor stripe temperature, without a systemic treatment of the effects of current density on GMR lifetime.

There is, therefore, a need for a system and method for providing correct bias current setting scheme for transducer heads in disk drives based on the resistance of each individual head measured by establishing bias current dependence of GMR resistance and GMR lifetime.

BRIEF SUMMARY OF THE INVENTION

In one embodiment, the present invention provides methods to establish dependence of head lifetime on bias current (i.e., time to failure-TTF) and head resistance specification, to meet head lifetime requirements, by taking both head (i.e., stripe) temperature and bias current into consideration.

The head bias current is adjusted based on individual head resistance and temperature for optimizing head performance and GMR lifetime. Generally, lower bias current is applied to GMR sensors with high resistance to avoid high sensor temperature and to prolong GMR lifetime.

A method is provided for determining correct bias current setting (level) in a disk drive based on the resistance of each individual head, by establishing: (1) dependence of GMR resistance on bias current, and (2) dependence of lifetime on bias current. The bias current setting processes can be programmed into each disk drive and can be different in the details for each GMR head or disk drive supplier.

Further, a method is provided for GMR lifetime test at the drive level (i.e., after drive assembly) based on the established bias current dependent lifetime.

BRIEF DESCRIPTION OF THE DRAWINGS

These and other features, aspects and advantages of the present invention will become understood with reference to the following description, appended claims and accompanying figures where:

FIG. 2 shows an example flowchart of an embodiment of the steps of a method of selecting bias currents for predetermined lifetime, according to the present invention;

FIG. 3, shows example plots of a head signal amplitude vs. time for different bias current levels, at a fixed head temperature;

FIG. 4 shows example plots of head lifetime vs. bias current at different head temperatures;

FIG. 5 shows example plot of head temperature vs. bias current for a selected head lifetime;

FIG. 6 shows example plots of head temperature vs. stripe resistance at different bias current levels;

DETAILED DESCRIPTION OF THE INVENTION

Figure 1:
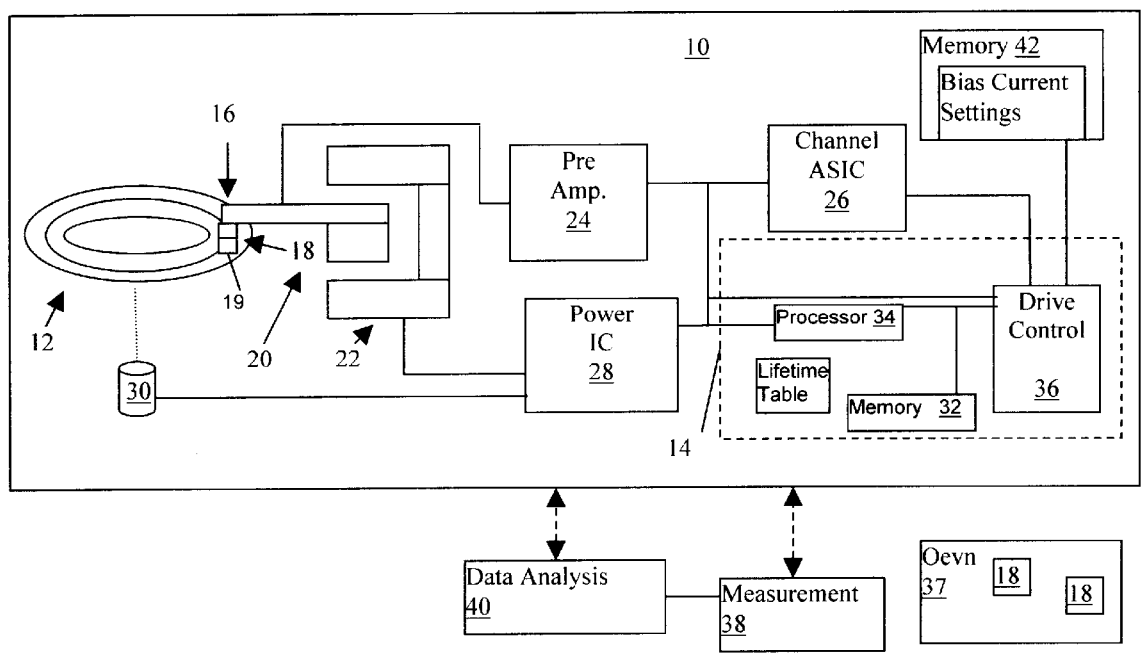
FIG. 1 shows an embodiment of a disk drive in which the present invention can be implemented.

Referring to FIG. 1, an example embodiment of a disk drive including GMR heads according to the present invention, is shown. The disk drive 10 comprises storage media such a data disks 12, and a disk drive controller 14 for interfacing with a host and controlling disk drive operations including data transfer to from disks 12, therein. The disk drive 10 further includes a head structure 16 including one or more MR heads 18 moved by a support arm of an actuator assembly 20 via a VCM 22 across tracks of one or more disks 12 for data storage and data retrieval, and tracking to maintain the head over a target position. Each disk 12 includes a servo pattern including servo bursts and sectors for system and user data, respectively, on a recording surface thereof. The disk drive 10 further includes a preamplifier 24 for amplifying the read and write signals from and to the disks 12, respectively, and a read/write channel 26 for encoding and decoding data between user information and data written on disks 12. The channel 26 also decodes servo track number and converts servo burst amplitudes into digital values. The disk drive 10 further includes a power driver IC 28 for driving the actuator 20 and a spindle motor 30 for rotating the disks 12. In one example embodiment, the controller 14 includes a memory 32 microcontroller (e.g., microprocessor) 34 for controlling head bias current, and a drive control 36 for general control of the components of the disk drive 10 and interface to a measurement component 38 and a data analysis component 40. the host system 12. The memory 45 can include RAM and/or non-volatile (NV) memory such as EEPROM, ROM, etc. The disk drive 10 can further include memory 42 for storing other program instructions or data.

The present invention provides a method to determine GMR head resistance specification to ensure head lifetime (e.g., 5 year lifetime) in disk drives. Because it is not economical to test a head for the length of the desired lifetime (e.g., 5 years), to determine if the head operates satisfactorily for that long, the present invention provides accelerated testing by using stress conditions such as stress temperatures (e.g., in an oven), and bias currents (increasing bias current increases current density and also stress temperature). A method to accelerate lifetime testing of a head having a resistance R is provided along with techniques for using the test result data to accurately estimate the head lifetime for different bias currents and ambient temperatures. As such, in one aspect the present invention allows accurate estimation of lifetime of heads, with short testing time. Accuracy of lifetime estimation is a function of the amount of test data and length of testing and there is a tradeoff between accuracy and testing time. Many heads can be tested and sufficient data collected in a shorter time to estimate actual head lifetime.

Conventionally head lifetime is estimated as a function of head temperature. According to the present invention, head lifetime is determined as a function of temperature of stripe 19 in the head 18 and current density (i.e., current density effects head lifetime) in the GMR head stripe 19 for more accuracy.

To estimate head lifetime, dependence of head lifetime on temperature and bias current (current density), and dependence of head resistance on bias current, are established. In heads 18 with different resistance, the head lifetime dependence on bias current and temperature, are not the same. Higher resistance heads heat up faster and higher because the current density in such heads is higher. Application of the same bias current to a high resistance head and to a low resistance head, results in the high resistance head heating faster then the low resistance head.

A high resistance head has a smaller sensor 19 size than a low resistance head. Application of the same bias current to both heads causes higher current density in the high resistance head 18 than in the low resistance head 18, and therefore to higher Joule heating in the high resistance head relative to the low resistance head (i.e., with higher current density, there is higher Joule heating).

Difference in heating for the same resistance heads due to ambient temperature difference at the same bias current, causes a difference in lifetime among such heads. Further, difference in heating for different resistance heads due to Joule heating (caused by different current density) causes a difference in lifetime among such heads. And, the increase in stripe temperature due to Joule heating of bias current also increases the stripe resistance.

It is an objective of the present invention to provide essentially constant lifetime for all heads 18 in different disk drives 10 (different design heads have different resistances due to different resistance distribution). Accordingly, in one aspect, the present invention provides bias current settings (levels) for essentially the same lifetime for different heads 18, based on bias current and temperature.

For example, several head vendors such as vendorA, vendorB and vendorC each provide GMR heads with same or different resistance. As such, for different vendors there may be different bias current settings. It is desirable to select a bias current for each head such that the heads 18 have essentially the same lifetime in disk drives (e.g., 5 years). In one example, for VendorA's heads with resistance of 40 Ohm, the bias current may be set at 5 mA; for VendorB's heads with resistance of 40 Ohm, the bias current may be set at 4.5 mA; and for VendorC's heads with resistance of 42 Ohm, the bias current may be set at 4.2 mA, whereby each head provides a 5 year lifetime. There may be different bias currents for different resistance heads for each vendor. For VendorA's heads there may be one set of bias currents, and for VendorB there maybe a different set of bias currents, to provide the same lifetime.

In one example, the heads that are placed in different disk drives have different resistances. Each head has a identification code that is stored in the disk drive. Then the head resistance is measured, and based on the head vendor and the head measured resistance, a lookup table (Lifetime Table) is crated based on said head test results. Using the lookup table, a head having a measured resistance of e.g. 40 Ohms from vendorA is set to a bias current of 3.5 mA, and vendorD at 40 Ohms is set to 3.8 mA, and vendorF at 45 Ohms is set at 3.0 mA. The bias current is provided such that the different heads have the same lifetime in different predicted environments.

As such, according to the present invention, the bias current level is selected to provide constant lifetime for the heads 18, by taking both stripe 19 temperature and bias current density into consideration.

Referring to the example steps in FIG. 2, and graphs in FIGS. 3–6, according to a version of the present invention, readback signal amplitude degradation in GMR heads due to stress conditions (e.g., temperature) are measured. This is because over time amplitude of the readback signal degrades.

Keeping stripe temperature Tstripe the same, increasing bias current, decreases readback signal sensitivity. Example tests and measurements in Tables 1 and 2 below, show amplitude degradation of GMR heads (e.g., 7 heads of slider resistance 42 Ohms in Table 1, and 6 heads of slider resistance 42 Ohms in Table 2) stressed with different bias currents to similar Tstripe of about 168 C. for different stress durations (2 hours and 33 hours). According to Table 1, on average 14% amplitude loss (i.e., LFTAA(33)/LFTAA(0)= 86%) was found in heads stressed by 4.5 mA for 33 hours, and according to Table 2, on average 41% amplitude loss (i.e., LFTAA(33)/LFTAA(0)=59%) was found in heads stressed by 5.0 mA for 33 hours.

TABLE 1

4.5 mA stress @ 135° C. oven temperature—168° C. Tstripe
Phantom Preliminary ATR test 4.5 mA @ Temperature 135 C. (slider resistance 42 ohms)

| No. | LFTAA(0) Initial | LFTAA(2) After 2 Hours 135 | LFTAA(2)/ LFTAA(0) 135 | LFTAA(33) After 33 Hours 135 | LFTAA(33)/ LFTAA(0) 135 | Slope 135 | Intercept 135 | Tstripe |
|---|---|---|---|---|---|---|---|---|
| 1 | 0.944 | 0.867 | 92% | 0.876 | 93% | 0.0036 | 0.9157 | 166.8 |
| 2 | 0.981 | 0.958 | 98% | 0.810 | 83% | −0.0539 | 1.0144 | 169.4 |
| 3 | 0.925 | 0.841 | 91% | 0.780 | 84% | −0.0237 | 0.9254 | 165.9 |
| 4 | 0.924 | 0.930 | 101% | 0.819 | 89% | −0.0429 | 1.0362 | 168.1 |
| 5 | 1.203 | 1.128 | 94% | 0.991 | 82% | −0.0406 | 0.9657 | 164.8 |
| 6 | 1.093 | 1.144 | 105% | 1.009 | 92% | −0.0442 | 1.0772 | 172.1 |
| 7 | 1.365 | 1.123 | 82% | 1.059 | 78% | −0.0167 | 0.8344 | 167.4 |
| Average | | | 95% | | 86% | | | 167.8 |

TABLE 2

5.0 mA stress @ 125° C. oven temperature—168° C. Tstripe
Phantom Preliminary ATR test 5.0 mA @ Temperature 125 C. (slider resistance 42 ohms)

| No. | LFTAA(0) Initial | LFTAA(2) After 2 Hours 145 | LFTAA(2)/ LFTAA(0) 145 | LFTAA(33) After 33 Hours 145 | LFTAA(33)/ LFTAA(0) 145 | Slope 145 | Intercept 145 | Tstripe |
|---|---|---|---|---|---|---|---|---|
| 1 | 1.280 | 0.984 | 77% | 0.622 | 49% | −0.1009 | 0.8387 | 168.3 |
| 2 | 1.133 | 0.936 | 83% | 0.794 | 70% | −0.0448 | 0.8570 | 162.5 |
| 3 | 0.976 | 0.882 | 90% | 0.373 | 38% | −0.1859 | 1.0320 | 171.8 |
| 4 | 0.961 | 0.874 | 91% | 0.681 | 71% | −0.0716 | 0.9593 | 163.8 |
| 5 | 1.133 | 0.898 | 79% | 0.769 | 68% | −0.0406 | 0.8207 | 171.6 |
| 6 | 1.093 | 1.018 | 93% | 0.543 | 50% | −0.1553 | 1.0395 | 171.6 |
| Average | | | 86% | | 59% | | | 168.3 |

Referring to FIG. 2, before assembly in disk drives 10, during an example component level testing, GMR heads 18 are placed in ovens 37 at higher than normal oven temperatures to stress the heads 18 and measure amplitude degradation in the heads. Head stripe 19 temperatures are kept constant by adjusting the oven temperate, and different stress bias currents e.g. i1, i2 and i3 are applied to the heads for a time period. Then the bias current is discontinued and the heads are taken out of the oven, and head readback signal amplitude for each bias current is measured (step 100). The time-to-failure (TTF) value is selected to be the time when the readback signal amplitude of a head degrades by e.g. 15%. FIG. 3 shows example curves 50 of measured readback signal amplitude vs. TTF for heads of the same resistance maintained at a constant stress temperature (e.g., T3), but at different stress bias currents i1, i2 and i3. Each curve 60 in FIG. 3 is obtained with a different stress bias current at temperature T3. A log scale is used for TTF such that the data point align in a straight line for easier data analysis. In FIG. 3, i1<i2<i3 (e.g., i1 is lowest current). For the i3 curve 50, the head readback signal amplitude degrades by 15% in less than an hour (TTF3) at very elevated stripe temperature T3 (due to oven heating, and Joule heating caused by the bias current i3).

In the example of FIG. 3, keeping stripe temperature constant (by adjusting oven temperature), each curve 50 shows effect of current density (bias current) on lifetime TTF. The stripe temperature is measured, and stripe temperature variation due to Joule heating caused by bias current is compensated by varying the oven temperate to maintain the stripe temperature constant. A goal is to determine upper limit of head resistance to select bias current setting to ensure that head 18 survives in a disk drive 10 for e.g. TTF=5 years. The above steps are repeated for different values of stripe temperature T (Tstripe).

Example FIG. 4 shows measured data of FIG. 3, wherein each curve 52 in FIG. 4 is a plot of data points in bias current vs. TTF log scale fashion, for different stress temperatures T1, T2 and T3 (step 102). The set of curves 50 in FIG. 3 for bias currents i1, i2, i3, etc., represents one curve 52 for T3 in FIG. 4, as shown. The measurement of stripe temperature T3, and the data points correspond to the pairs shown in FIG. 4 (TTF1 at i1, TTF2 at i2, TTF2 at i3, all for T3). Each curve 52 in FIG. 4 is for the same head resistance, and as such the stripe temperature is different in each curve 52 due to different bias current (i.e., T1, T2, T3, each is stripe temperature as a combination of oven temp (Toven) and Joule heating (Tjoul) due to bias current, wherein the oven temperature is kept constant). A dotted line is drawn at 5 year TTF to intersect the extrapolated curves 52 at T1 T2 and T3, at bias current values I1, I2 and I3, respectively. As such, as shown by a curve 54 in FIG. 5, each pair of bias current and corresponding temperature (I1, T1), (I2, T2) and (I3, T3) represents the bias current value that provides a head lifetime of 5 years at the corresponding temperature for the heads of the same resistance (step 104).

There is a relationship between stripe resistance and stripe temperature (i.e., a TCR coefficient providing a linear relationship between the stripe resistance and stripe temperature, such that: stripe resistance=A×stripe temperature+B, wherein A and B are constants). As such, the stripe temperature can be obtained by measuring the stripe resistance, and then extrapolated to find the corresponding stripe temperature using TCR.

Similarly, the stripe resistance can be obtained by measuring the stripe temperature and converting the stripe temperature to the stripe resistance using TCR (step 106). Example FIG. 6 shows a curve 56 representing the above data points as stripe (slider) resistance R vs. bias current. The resistance values are plotted against bias current, and curve fitting is performed, showing the effect of bias current on stripe resistance (e.g., due to Joule heating). The curve fitting equation (i.e., curve 56) provides the head resistance specification (step 108).

For example, for the same bias current, stripe temperature T1 is translated to stripe resistance R1 using said relationship. (i.e., curve 56). For a desired constant lifetime (e.g., 5 years), following the curve 56 provides the constant lifetime. For a stripe resistance R1, selecting a bias current of I1, achieves a 5 year head lifetime. For a stripe resistance R2, selecting a bias current of I2, achieves a 5 year head lifetime. Using a measured stripe resistance of R1 (i.e., head resistance based on oven temperature and Joule heating), then the bias current is set to I1 to achieve the desired head lifetime (e.g., 5 years). If the stripe resistance is R2, then the bias current is set to I2 to achieve the desired head lifetime (e.g., 5 years). As can be seen, for the case of higher resistance R1 (i.e., R1>R2), a lower bias current I1 (i.e., I1<I2) is selected to obtain the same lifetime as for the lower resistance R2.

In another example, a group of heads 18 with the same resistance Ra, are tested. The effective stripe temperature T is combination of oven temperature (To) and Joule heating (Tj) due to bias current (i.e., T=To+Tj). The increase in stripe temperature due to Joule heating of bias current increases the stripe resistance to the hot resistance HRa. In another group of heads 18 with resistance Rb, the hot resistance due to Joule heating is HRb. If Rb>Ra, the increase in resistance in the second group of heads due to Joule heating is more than the resistance in the first group of heads.

For calibration, an environment/ambient temperature for testing is specified. Because the stripe temperature is combination of oven heating and Joule heating, an environment temperature that the head will most likely experience in the disk drive in actual use, is selected to obtain a calibration curve for TCR (coefficient of resistance) for translating measures stripe temperature to resistance, described above. For different groups of heads, there are different TCRs.

As such, a relationship between head lifetime and head resistance is provided by this technique. Generally, the higher the head resistance, the shorter the lifetime because of higher stripe temp due to Joule heating. Therefore, it is preferable to not use high relative resistance in the heads, wherein the boundary for the head resistance for guarantee of desired lifetime is determined. When the heads 18 are installed in the disk drives 20, at the drive level, the bias current is adjusted according to the predicted ambient drive temperature, and the resistance of each head 18. The combination of ambient temperature and current density determines head lifetime.

In the above examples, the lifetime values obtained for accelerated oven testing are extrapolated to obtain actual lifetime values for the heads. For, example, in FIG. 4, a portion of the curve 52 is extrapolated, to the desired lifetime (e.g., 5 year TTF). The measurement of stripe temperature, T3, and the data points correspond to the pairs shown in FIG. 3 (TTF1 at i1, TTF2 at i2, TTF2 at i3, all for temperature T3 for example). A head is tested in the oven for e.g. two days to obtain the (i1, TTFL), (i2, TTF2) and (i3, TTF3) data points for T3 (and of other temperatures and bias currents) below the 5 year TTF. Then curve fitting to the data points allows extrapolation of the curve 52 to the 5-year TTF.

For the example in FIG. 3, typically a head 18 is stress tested by heating in an oven to a constant temperature (e.g., T3) with bias currents (e.g., i1) for one day, then removed and readback signal amplitude of the head is measured (e.g., 10% degradation). Then the head 18 is put back in the oven and stress testing is continued for two additional days under the same conditions as before (same temp (e.g., T3) and bias current (e.g., i1)). The head 18 is then removed and the head readback signal amplitude degradation measured again (e.g., 30% degradation), providing a second data point. If a Failure Threshold is selected at 15% amplitude degradation, there is one data point for 10% degradation, and another for 30% degradation, allowing extrapolation/interpolation to find the bias current for 15% degradation. The test can be longer and more frequent for more data points to obtain more accurate results (tradeoff is between test time and accuracy).

For a set of data points, a polynomial that fits the data is determined, and then extrapolated to determine actual lifetime under actual field conditions. By taking joule heating due to current density into consideration, as well as ambient temperature, the estimate of actual lifetime is even more accurate according to the present invention.

Figure 7:
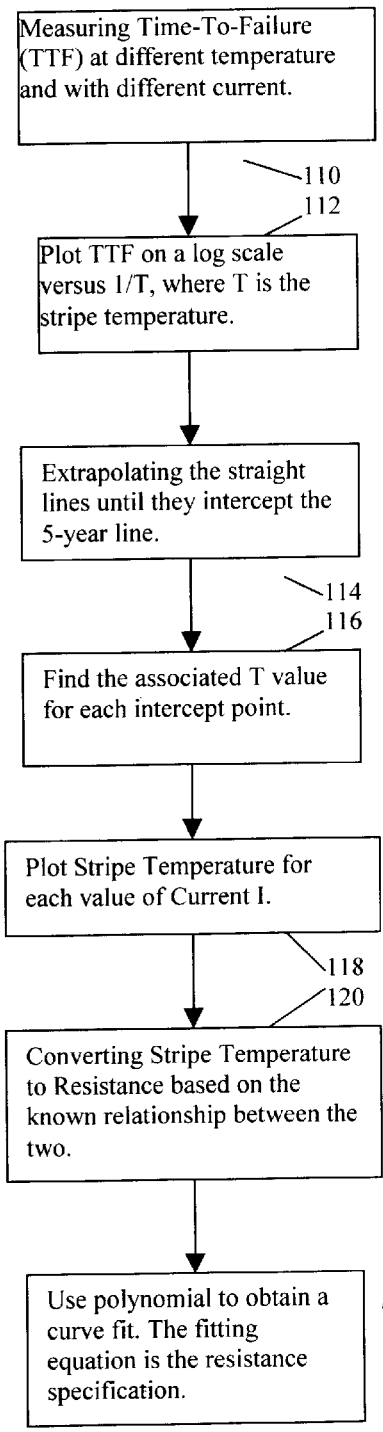
FIG. 7 shows an example flowchart of another embodiment of the steps of a method of selecting bias currents for predetermined lifetime, according to the present invention.
Figure 8:
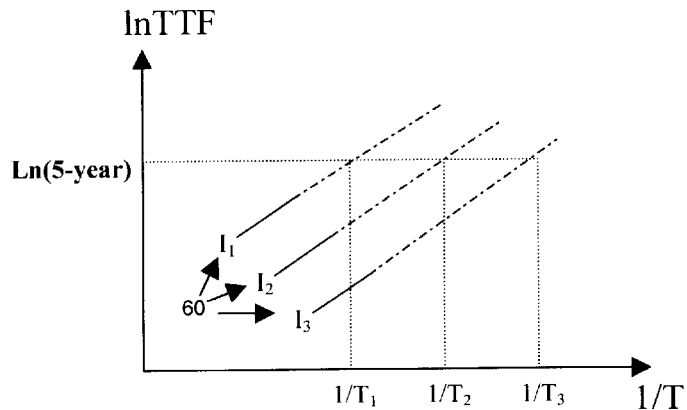
FIG. 8 shows an example plot of head lifetime vs. inverse head temperature.
Figure 9:
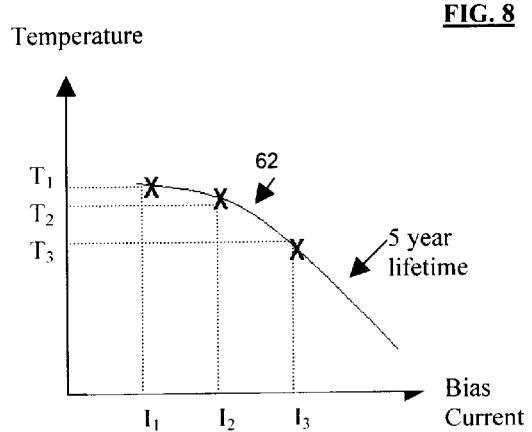
FIG. 9 shows example plot of head temperature vs. bias current for a selected head lifetime.
Figure 10:
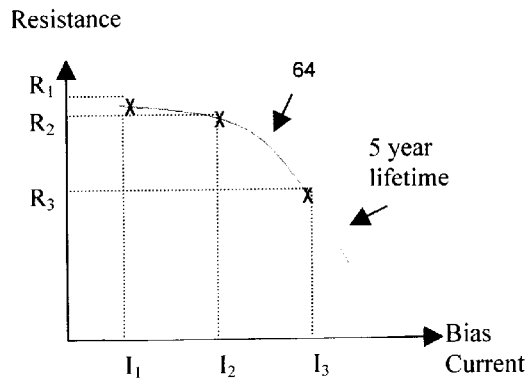
FIG. 10 shows example plots of head temperature vs. stripe resistance at different bias current levels.

Referring to the example steps in FIG. 7, and graphs in FIGS. 8–10, according to another example embodiment of the present invention, readback signal amplitude degradation in GMR heads 18 due to stress conditions (e.g., stress temperature and stress bias current) are measured. The TTF at different stress temperatures (e.g., T1, T2, T3) and with different bias currents (e.g. I1, I2, I3) are measured (step 110). A plot of the measured TTF values on a log scale vs. stripe temperature T is shown in FIG. 8 (step 112). The, 1/T scale is used here because of the relationship between lifetime and temperature, wherein TTF=f($e^{Q/kT}$) such that LnTTF=f (Q/kT) where Q is the "activation energy" and k is the Boltzman constant.

As shown in FIG. 8, curves 60 for each bias current are extrapolated until they intercept the 5-year TTF dotted line (step 114), and the associated values T for each intercept point (on horizontal axis) is determined for the 5 year lifetime (step 116).

Next, using the above data values, the stripe temperature T for each value of bias current is determined as shown by the example curve 62 in FIG. 9 (step 118) (the bias currents I1, I2 and I3 in FIG. 8 are as in FIG. 9). The stripe temperature data is then converted to stripe resistance based on said TCR relationship, as shown in FIG. 10 (step 120). Then, curve fitting (e.g., polynomial fitting) to obtain a curve fit 64 as shown in FIG. 10 (step 122). The fitting equation (i.e., curve 64) provides the head resistance specification. The bias current values can be selected based on the specification curve 64 in FIG. 10.

The present invention allows establishing bias current dependence of lifetime and head resistance specification to meet lifetime requirements with both stripe temperature and bias current taken into consideration. This is because head resistance is a function of bias current (e.g., FIG. 6), and because head lifetime is a function of bias current (e.g., FIG. 3) and head temperature (e.g., FIGS. 4–5).

To obtain the bias setting algorithm (e.g., fitting curves 56 and 64 in; example FIGS. 6 and 10 above, respectively), the GMR heads 18 are tested at the component level (i.e., before they are in the disk drives 10) as described. To ensure disk drive reliability, it is desirable to predict head lifetime in the disk drive. The present invention provides accelerated testing by using stress temperatures (e.g., in an oven), and bias currents (increasing bias current increases current density and also stress temperature).

The effect of oven temperature, and temperature due to Joule heating of current density (current effect) are distinct. As shown and described in relation to FIGS. 2–6, above, a technique is used to establish a bias algorithm using current bias dependence of the head resistance at the component level (i.e., testing to separate out bias current effect and temperature effect, to obtain bias dependent resistance), whereby a bias current is selected for a desired lifetime. Then, with the head 18 in the disk drives 10 (i.e., drive level test described further below), using the acceleration factors already established based on the component level tests, a reliability test is performed to determine how reliable the head is.

As such, dependence of lifetime on stress current is established as a curve (e.g., FIGS. 3 and 8). Then based on the dependence curves, an acceleration condition is applied to the head during the drive level testing. Preferably, during the drive level testing, temperature is also raised, but not as much as component level test above, and the bias current is also increased in order to accelerate the test when the head is in the disk drive.

The methods for measuring (establishing) bias current dependence of GMR head lifetime (e.g., ATR lifetime) and bias current dependence of resistance for GMR heads, according to the present invention, allow proper bias current setting for each individual head in the disk drive to ensure GMR reliability (e.g., predictable lifetime). Head performance can be frequently monitored during operation in customer environment and the bias current can be automatically adjusted downward if GMR readback signal degrades below certain limits (the disk drive preamp provides the bias current to the head wherein the current level is controlled by the drive controller firmware). These limits can be loaded into the disk drive and are usually different in details for each GMR supplier. In one embodiment, the disk drive preamp 24 provides the bias current to the head 18. The level of bias current provided by the preamp 24 is controlled by the firmware in disk drive channel ASIC 26 or controller 14 (e.g., processor 34 or drive control 36). Said Lifetime Table and bias current settings/levels are stored in the disk drive for setting the bias current as described.

Lifetime can be defined by various techniques such as Amplitude Thermal Robustness (ATR), which according to the present invention includes a technique to determine current dependence lifetime in addition to temperature. ATR test algorithms and extrapolation formulas according to the present invention can be included in the disk drive programming (e.g., in Diag-script or super-command script). A drive level lifetime test can be conducted by including additional disk drives in reliability demonstration test (RDT) or ongoing reliability test (ORT). Disk drive level verification before mass production is important as a further check of the component level results above.

Determining said bias current dependence of lifetime and bias current dependence of resistance for GMR heads, enables GMR AIR lifetime test in the disk drive by providing test acceleration factors and extrapolation formulas to determine GMR ATR lifetime from current stressed condition to nominal operating condition in the field. Drive level ATR test can provide an essentially final and conclusive verification to guarantee GMR reliability lifetime in the field. In one example, ATR performance is only conducted at GMR component level (i.e., GMR head not in disk drive) using oven temperatures as high as e.g. 150 C. (this procedure may not be applicable for drive level tests due to high stress temperatures). Bias current stress with moderate temperature increase is the desirable method to; perform GMR drive level (i.e., GMR head in disk drive) ATR lifetime test for lifetime determination.

When performing component level and drive level AIR lifetime test GMR stress factors/conditions must be selected, and the GMR lifetime extrapolation determined from the stress conditions to the nominal operating conditions. Both high GMR stripe temperature (Tstripe) and high bias current (Ibias) are used for component level GMR ATR stress tests. At the component level, temperature stress up to e.g. 150 C. (Toven) with nominal Ibias can be used as the major test, acceleration factor due to simplicity in said extrapolation, described above.

Effects induced by bias current stress include not only intrinsic current, but also temperature increase through Joule heating, wherein Tstripe is a function of $I^2 \times R$, such that I is the bias current, and R is resistance of the MR sensor in the head. Calculation and data collection allow separation of pure bias current effect from temperature effect due to combined oven temperature and Joule heating. To accelerate GMR amplitude decay (i.e., time to failure) in disk drives, higher read bias current than nominal operating current, is applied at maximum allowed drive environmental temperature (e.g., 55 C. oven temperature). By providing a process/algorithm to select proper bias current stress factors for determining lifetime of the head, and a process/algorithm to extrapolate test GMR lifetime to nominal conditions for each head family (e.g., head vendor) in the disk drive firmware, ATR test and lifetime determination can be performed at drive level. Various example methods for determining bias dependence of ATR lifetime are described herein.

The readback signal amplitudes include spin spin-stand amplitude (i.e., Guzik), R(H) amplitude (i.e., Quasi-static tester), or drive level (i.e., selfscan). To determine bias current dependence of maximum allowed resistance specification, a correlation (key point) between: (1) maximum allowed Tstripe (stripe temperature) to guarantee a desired GMR lifetime (e.g., 5 years) and (2) bias (bias current), are determined first, as described above and detailed further below.

Thus, a method of determining bias current dependence of ATR failure (TTF) includes the steps of keeping constant stripe temperature by adjusting stress current and stress environmental temperature, to achieve similar GMR resistance at various stress conditions. By keeping stripe temperature constant (e.g., adjusting oven temperature), the bias current dependence of ATR lifetime is determined directly. Normalized GMR readback signal amplitude degradation as a function of time is determined using several different bias currents Ibias, and environmental temperature combinations, to keep constant stripe temperature. Similar amplitude degradation values can be generated at different stripe temperatures.

Based on the amplitude failure criteria (i.e. desired lifetime based on amplitude degradation), Ln(TTF) at each Ibias is obtained and bias current dependence of GMR lifetime is determined for each desired stripe temperature. For example, bias current (Ibias) dependence of ATR lifetime is extracted for three different stripe temperatures (T or Tstripe) 180 C., 165 C. and 150 C. Using that data, various combinations of Tstripe and Ibias for stressing GMR heads to a selected ATR lifetime are derived (e.g., FIGS. 4–5, 8–9, show examples of such combinations/relationships of Tstripe and Ibias for stressing GMR heads to e.g. 5 year ATR lifetime). Said Tstripe vs. Ibias relationships are used to extrapolate ATR lifetime from one Ibias to another, and are further used to determine GMR bias current stress level and to extrapolate GMR lifetime from stressed condition to nominal condition.

In the example shown in FIG. 8, Ln (TTF) vs. 1/Tstripe is generated using GMR heads with constant resistance and several component level oven stress temperatures. The maximum allowed Tstripe for e.g. 5 year GMR lifetime, determined based on constant resistance GMR, can then be adjusted based on the relationships established in FIG. 9 for different bias currents. Then as shown in example of FIG. 10, relationships between Tstripe and GMR resistance-for various bias currents, are established. As such, according to the present invention, as shown in examples of FIG. 6 (i.e., curve 56) and FIG. 10 (i.e., curve 64), head resistance spec, Rs at different bias currents are determined by taking both stripe temperature and bias current effects into consideration.

The above example methods allow obtaining bias current dependence of ATR lifetime using constant resistance GMR and different stress bias currents. Then, maximum allowed Tstripe for e.g. 5 year ATR lifetime for different bias currents is obtained. The maximum allowed Rs specification for various bias currents is also determined. Then extrapolation formula (e.g., polynomial curve fit) of lifetime (e.g., Ln(TTF)) for different Ibias at various Tstripe is determined from the Tstripe vs. Ibias relationships described. This extrapolation formula is used for drive level bias stress and lifetime extrapolation.

For drive level ATR life time testing, bias current dependence of ATR lifetime is established (i.e., an ATR resistance specification at various bias currents at component level), and then :bias current dependence of ATR resistance specification, and bias current dependence of ATR lifetime, are pre-loaded into disk drive for each vendor's heads. Therefore, the dependence of head resistance on bias current, and dependence of ATR lifetime on bias current, determined above, are pre-loaded into the disk drive for each vendor's heads. For each head vendor, the head resistance is measured for each head in a disk drive and then for a desired lifetime, proper bias current is selected based on the measured resistance and pre-loaded bias current dependence of ATR resistance specification. The pre-loaded bias current dependence of ATR lifetime is used for drive level ATR test.

Figure 11:
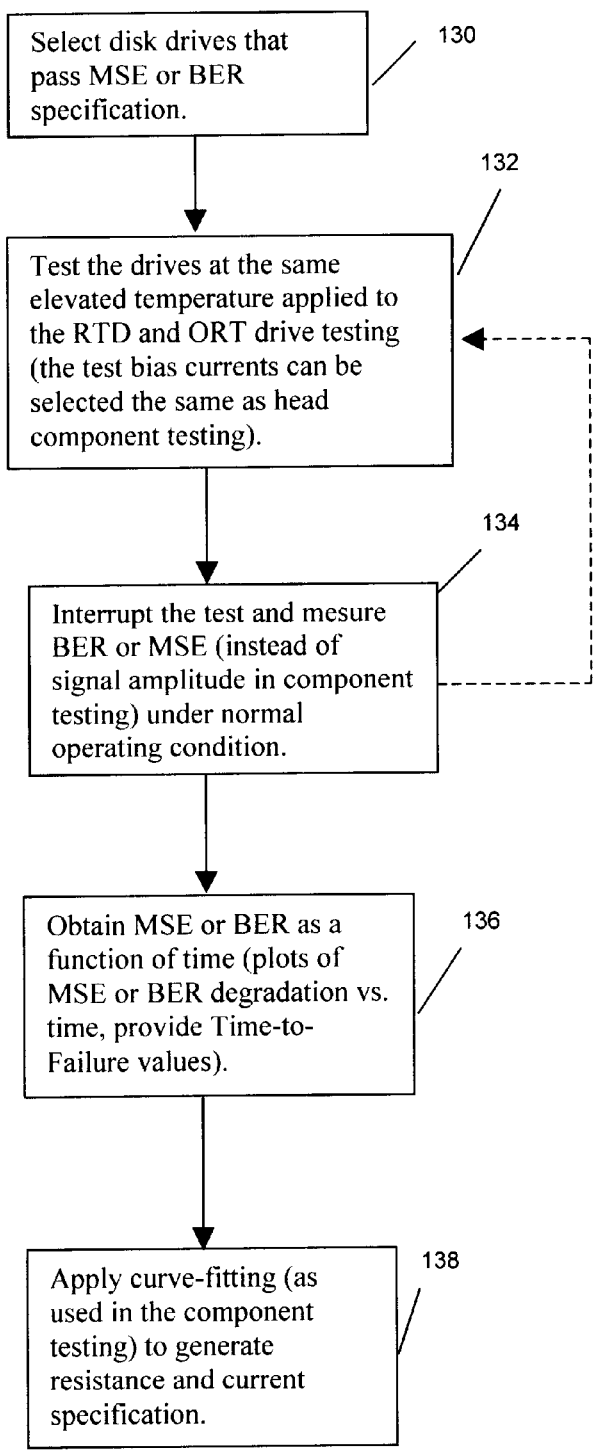
FIG. 11 shows an example flowchart of steps of drive level lifetime testing according to another aspect of the present invention.

A version of a Drive Level ATR test is shown by example steps in flowchart of FIG. 11. Failure criteria such as record/playback error rates (e.g., Minimized Square Error (MSE) or Bit Error Rate (BER)) can, be used as the indices in the disk drive for drive level tests. Failure criteria of MSE and BER are determined based on requirements of particular disk drive platform. A set of disk drives 10 that pass internal MSE or BER specification are selected (step 130). The disk drives are tested for a period of time at elevated temperatures (e.g., at the same elevated temperature that is applied to the RTD and ORT drive testing), wherein the test bias currents can be chosen to be e.g. the same as head component head testing (step 132). The test is interrupted and the MSE or BER (instead of readback signal amplitude in component testing) are measured under normal operating conditions (step 134). The test can be restarted again to obtain more measurements by repeating steps 132 and 134. Then values of MSE or BER for the heads in the disk drives are obtained as a function of time, and the values of MSE or BER degradation vs. time, provide Time-to-Failure (step 136). The same analytical technique as used in the component testing is applied to obtain resistance and current specification (step 138).

Stress levels, including bias current, head slider temperature and sensor stripe temperature selected for ATR test acceleration are determined as described. For example, the Ln(TFF) vs. bias current plot for each GMR vendor is determined using component level testing above. The stripe temperature can be calculated using the following example relation:

$$Tstripe=(((Rs\_stress-Rs\_amb)/Rs\_amb)-1)/TCR+Tambient$$

wherein:
Rs_stress: GMR resistance measured by BHV (buffer head voltage) at component level stress condition,
Rs_amb: GMR resistance measured at ambient using low bias current,
TCR: Thermal coefficient of sensor resistance (Each vendor's TCR number is recorded into the disk drive memory),
Tambient: drive ambient temperature during Rs_amb measurement.

The disk drive ATR lifetime test can be performed using additional disk drives in parallel with RTD or ORT drive testing to take advantage of the oven time for these two tests. The total stress time for this test can be adjusted by dialing in estimates of stress current to the head according to the Ln(TTF) vs. Ibias correlation at RDT (or ORT) oven temperature. Further, for example, 50 to 100 disk drives from each product line can be used for this test to obtain sufficient data for statistical analysis. The simplest implementation for the ATR lifetime test includes go-no-go type test, in which the stress bias current is selected so that test time equals to ORT or RDT test time (i.e., lifetime under stressed condition). Then disk drive MSE or BER is checked before and after the stress at nominal operating operation condition.

More sophisticated lifetime test, i.e., lifetime determination, includes measuring drive MSE or BER after different stress durations until the indices reach failure point. In that case, less aggressive stress levels can be chosen. By extrapolating the ATR lifetime from stressed to non-stressed condition using the algorithms stored in disk drive memory from the component level testing, the drive ATR lifetime for the tested GMR head can be determined at disk drive level.

Algorithms for selecting acceleration factors, Tstripe estimation, and test execution can be stored in the disk drive. The stored algorithms can be shipped with disk drives and can be protected from unauthorized access. As necessary, upon ATR drive failures, a stored test can be executed using built-in codes on surviving heads (e.g., low resistance heads). The remaining lifetimes can be estimated by subtracting usage time elapsed from the guaranteed 5 year lifetime.

The present invention allows performing ATR lifetime test in drive level, as described, to guarantee GMR reliability even if ATR resistance specification is defined based on thorough reliability studies at component level. A disk drive level ATR verification test can be used to prove reliability associated with platform related differences, i.e., bias setting accuracy, worst case drive temperature, excessive writing, etc.

The methods described herein for choosing stress factor, stress time, and lifetime extrapolation basis, make drive level lifetime test feasible and meaningful. The conventional temperature stress using nominal bias requires 5 years to prove the drive reliability. According to the present invention, reduction in lifetime due to intrinsic current effect is included in the overall lifetime determination because conventional head lifetime determination using only temperature effect is not accurate.

The present invention has been described in considerable detail with reference to certain preferred versions thereof;

however, other versions are possible. Therefore, the spirit and scope of the appended claims should not be limited to the description of the preferred versions contained herein.

What is claimed is:

1. A method of selecting bias supply sources for magneto-resistive transducer (MR) heads for data storage devices to provide essentially the same predetermined lifetime for the MR heads, comprising the steps of:
   (a) determining dependence of head lifetime on bias supply level and on head stripe temperature; and
   (b) setting a bias supply level for each head based on said dependence of lifetime on bias supply level and on head temperature, to provide essentially the same predetermined lifetime for the heads.

2. The method of claim 1, wherein step (a) further includes the steps of:
   exposing multiple heads of essentially the same resistance to stress conditions at different bias supply levels;
   measuring readback signal amplitude degradation of the heads for each bias supply level, representing the lifetime of the heads under said stress conditions; and
   using the readback signal measurements to determine dependence of head lifetime on bias current supply level and on head stripe temperature.

3. The method of claim 2, wherein in step (a) measuring the readback signal amplitude further includes the steps of measuring readback signal amplitude degradation of the heads for each bias supply level and corresponding head stripe temperature.

4. The method of claim 3, wherein:
   step (a) further includes the steps of:
      (1) exposing the multiple heads to the stress conditions for a time period by applying different bias currents to the heads while maintaining essentially the same stripe temperature;
      (2) at the end of said time period, measuring, readback signal amplitude degradation of the heads for each bias current, representing the lifetime of the heads under said stress conditions;
      (3) using the measured data to determine lifetime values for different pairs of bias current and corresponding stripe temperature; and
   step (b) further includes the steps of:
      using said pairs of bias current and stripe temperature to select bias currents that achieve the predetermined lifetime based on stripe temperature.

5. The method of claim 1, wherein:
   step (a) further includes the steps of:
      exposing multiple heads of essentially the same resistance to stress conditions for a time period by applying different bias currents to the heads while maintaining essentially the same stripe temperature;
      at the end of said time period, measuring readback signal amplitude degradation of the heads for each bias current, representing the lifetime of the heads under said stress conditions;
      using the measured data to determine lifetime values for different pairs of bias current and corresponding stripe temperature;
      converting stripe temperature to head stripe resistance; and
      determining polynomial curve fit for pairs of bias current and corresponding resistance,
   step (b) further includes the steps of:
      using said curve fit to select bias currents that achieve the predetermined lifetime based on head stripe resistance.

6. The method of claim 4, wherein step (a) further includes the steps of repeating steps (1) and (2) for different stripe temperatures.

7. The method of claim 1, wherein:
   step (a) further includes the steps of:
      determining dependence of head resistance on bias supply level using stripe temperature,
      determining dependence of head lifetime on bias supply level and on head resistance, and
   in step (b) setting the bias supply further includes the steps of setting a bias supply level for each head based on said dependence of lifetime on bias supply level and head resistance, to provide essentially the same predetermined lifetime for the heads.

8. The method of claim 2, wherein in step (a) exposing the heads to stress conditions further includes the steps of applying different bias currents to the heads at different stripe temperatures.

9. The method of claim 8, wherein in step (a) measuring the readback signal amplitude further includes the steps of measuring readback signal amplitude degradation of the heads for each bias supply level and corresponding head stripe temperature.

10. The method of claim 9, wherein:
    step (a) further includes the steps of using the measured data to determine lifetime values for different pairs of bias current and corresponding stripe temperature; and
    step (b) further includes the steps of using said pairs of bias current and stripe temperature to select bias currents that achieve the predetermined lifetime based on stripe temperature.

11. The method of claim 10, wherein:
    step (a) further includes the steps of determining polynomial curve fit for pairs of bias current and corresponding stripe temperature, and
    step (b) further includes the steps of using said curve fit to select bias currents that achieve the predetermined lifetime based on stripe temperature.

12. The method of claim 10, wherein:
    step (a) further includes the steps of:
       converting stripe temperature to head stripe resistance,
       determining polynomial curve fit for pairs of bias current and corresponding resistance, and
    step (b) further includes the steps of:
       using said curve fit to select bias currents that achieve the predetermined lifetime based on head stripe resistance.

13. The method of claim 1, wherein:
    step (a) further includes the steps of:
       determining dependence of head resistance on bias supply level using stripe temperature,
       determining dependence of head lifetime on bias supply level and on head resistance, and
    in step (b) setting the bias supply further includes the steps of setting a bias supply level for each head based on said dependence of lifetime on bias supply level and head resistance, to provide essentially the same predetermined lifetime for the heads.

14. The method of claim 1, wherein in step (a) determining dependence of head lifetime further includes the steps of determining dependence of head lifetime on current density in the head stripe due to bias supply and on head stripe temperature.

15. A method of controlling bias supply sources for magneto-resistive transducer (MR) heads to provide essentially the same predetermined lifetime for the MR heads in data storage devices, comprising the steps of:
(a) determining dependence of head lifetime on bias supply level and on head resistance; and
(b) setting a,bias supply level for each head based on said dependence of lifetime on bias supply level and on head resistance, to provide essentially the same predetermined lifetime for the heads.

16. The method of claim 15, wherein in step (a) determining dependence of head lifetime further includes the steps of determining dependence of head lifetime on current density in the head stripe due to bias supply and on head resistance.

17. The method of claim 15, wherein in step (a) determining dependence of head lifetime further includes the steps of determining dependence of head resistance on bias supply level.

18. The method of claim 15, wherein:
step (a) further includes the steps of:
  (1) determining dependence of head resistance on bias supply level using stripe temperature,
  (2) determining dependence of head lifetime on bias supply level and on head resistance, and
in step (b) setting the bias supply further includes the steps of setting a bias supply level for each head based on said dependence of lifetime on bias supply level and head resistance, to provide essentially the same predetermined lifetime for the heads.

19. The method of claim 15, wherein step (a) further includes the steps of:
exposing multiple heads of essentially the same resistance to stress conditions at different bias supply levels,
measuring readback signal amplitude degradation of the heads for each bias supply level, representing the lifetime of the heads under said stress conditions,
using the readback signal measurements to determine dependence of head lifetime on bias current supply level and on head resistance.

20. The method of claim 19, wherein in step (a) measuring the readback signal amplitude further includes the steps of measuring readback signal amplitude degradation of the heads for each bias supply level and corresponding head stripe temperature.

21. The method of claim 20, wherein:
step (a) further includes the steps of:
  (1) exposing the multiple heads to the stress conditions for a time period by applying different bias currents to the heads while maintaining essentially the same stripe temperature;
  (2) at the end of said time period, measuring readback signal amplitude degradation of the heads for each bias current, representing the lifetime of the heads under said stress conditions;
  (3) using the measured data to determine lifetime values for different pairs of bias current and corresponding stripe temperature; and
  (4) converting stripe temperature to head stripe resistance;
step (b) further includes the steps of:
  using said pairs of bias current and stripe resistance to select bias currents that achieve the predetermined lifetime based on stripe resistance.

22. The method of claim 21, wherein step (a) further includes the steps of repeating steps (1) and (2) for different stripe temperatures.

23. The method of claim 19, wherein in step (a) exposing the heads to stress conditions further includes the steps of applying different bias currents to the heads at different stripe temperatures.

24. The method of claim 23, wherein in step (a) measuring the readback signal amplitude further includes the steps of measuring readback signal amplitude degradation of the heads for each bias supply level and corresponding head stripe temperature.

25. The method of claim 24, wherein:
step (a) further includes the steps of:
  using the measured data to determine lifetime values for different pairs of bias current and corresponding stripe temperature;
  converting stripe temperature to head stripe resistance; and
step (b) further includes the steps of using said pairs of bias current and stripe resistance to select bias currents that achieve the predetermined lifetime based on stripe resistance.

26. The method of claim 25, wherein:
step (a) further includes the steps of determining polynomial curve fit for pairs of bias current and corresponding stripe resistance, and
step (b) further includes the steps of using said curve fit to select bias currents that achieve the predetermined lifetime based on stripe resistance.

27. A method of setting bias supply sources for magnetoresistive transducer (MR) heads in data storage devices, to provide essentially the same predetermined lifetime for the MR heads in the data storage devices, comprising the steps of:
(a) selecting a set of data storage devices including MR heads,
(b) applying stress conditions to each storage device, the stress conditions including elevated temperatures at different bias supply levels,
(c) measuring performance of the heads in the storage devices according to error criteria,
(d) determining dependence of head lifetime on bias supply level and head resistance, and
(e) setting a bias supply level for each head based on said dependence of lifetime on bias supply level and on head resistance, to provide essentially the same predetermined lifetime for the heads.

28. The method of claim 27, wherein:
in step (b) applying stress conditions further includes the steps of exposing multiple heads of essentially the same resistance to stress conditions at different bias supply levels;
in step (c) measuring performance further includes the steps of measuring performance of the heads for each bias supply level, representing the lifetime of the heads under said stress conditions; and
in step (d) determining said dependence further includes the steps of using the performance measurements to determine dependence of head lifetime on bias current supply level and on head resistance.

29. The method of claim 28, wherein in step (c) measuring performance of the heads further includes the steps of measuring a bit error rate of the heads.

30. The method of claim 27, wherein dependence of head lifetime further includes the steps of determining dependence of head resistance on bias supply level.

31. The method of claim 27, wherein:
in step (d) determining said dependence further includes the steps of:

(1) determining dependence of head resistance on bias supply level using head stripe temperature, (2) determining dependence of head lifetime on bias supply level and on head resistance, and in step (e) setting the bias supply further includes the steps of setting a bias supply level for each head based on said dependence of lifetime on bias supply level and head resistance, to provide essentially, the same predetermined lifetime for the heads.

32. The method of claim 27, wherein:

in step (b) applying stress conditions further includes the steps of exposing multiple heads of essentially the same resistance to stress conditions at different bias supply levels, in step (c) measuring head performance further includes the steps of measuring error rate of the heads for each bias supply level, representing the lifetime of the heads under said stress conditions, and in step (d) determining said dependence further includes the steps of using the error rate measurements to determine dependence of head lifetime on bias current supply level and on head resistance.

33. The method of claim 32, wherein in step (c) measuring the error rate further includes the steps of measuring error rate of the heads for each bias supply level and corresponding head stripe temperature.

34. The method of claim 33, wherein:

in step (b) applying the stress conditions further includes the steps of exposing the heads to the stress conditions for a time period by applying different bias currents to the heads while maintaining essentially the same stripe temperature;

in step (c) measuring head performance further includes the steps of measuring error rate of the heads for each bias current, representing the lifetime of the heads under said stress conditions;

in step (d) determining said dependence further includes the steps of using the measured data to determine lifetime values for different pairs of bias current and corresponding stripe temperature, and converting stripe temperature to head stripe resistance; and in step (e) setting the bias supply levels further includes the steps of using said pairs of bias current and stripe resistance to select bias currents that achieve the predetermined lifetime based on stripe resistance.

35. The method of claim 34, further including the steps of repeating steps (b) and (c) for different stripe temperatures before step (d).

36. The method of claim 32, wherein in step (b) exposing the heads to stress conditions further includes the steps of applying different bias currents to the heads at different stripe temperatures.

37. The method of claim 36, wherein in step (c) measuring the head error rate further includes the steps of measuring error rate of the heads for each bias supply level and corresponding head stripe temperature.

38. The method of claim 37, wherein:

step (d) further includes the steps of:
using the measured data to determine lifetime values for different pairs of bias current and corresponding stripe temperature;
converting stripe temperature to head stripe resistance; and step (c) further includes the steps of using said pairs of bias current and stripe resistance to select bias currents that achieve the predetermined lifetime based on stripe resistance.

39. The method of claim 38, wherein:

step (d) further includes the steps of determining polynomial curve fit for pairs of bias current and corresponding stripe resistance, and step (e) further includes the steps of using said curve fit to select bias currents that achieve the predetermined lifetime based on stripe resistance.

40. A method for controlling a bias supply source for magnetoresistive transducer heads, comprising the steps of:

(a) applying different bias supply levels to several heads, (b) measuring temperature of each head at a corresponding bias level, (c) determining resistance of the heads at said different bias levels based on said measured temperatures, (d) determining dependence of lifetime of each head on corresponding bias level and determined resistance, and (e) selecting bias levels for multiple heads based on said dependence of lifetime on bias level and resistances, to provide a desired lifetime for the heads.

41. A method for controlling a bias supply source for magnetoresistive transducer heads, comprising the steps of:

(a) applying different bias supply levels to several heads, (b) measuring temperature of each head at a corresponding bias level, (c) determining resistance of the heads at said different bias levels based on said measured temperatures, (d) determining dependence of lifetime of the heads on said measured resistance and temperatures, and (e) selecting a bias level for the head family based on said measured resistance and temperature, to provide a desired lifetime for the head family.

42. In a disk drive having storage media for storing data, one or more magneto-resistive transducer heads for writing data to and reading data from the storage media, and a bias supply which provides a bias current to each head, a method of controlling the bias supply to a current to each head to essentially ensure a predetermined lifetime for the head, comprising the steps of:

(a) determining dependence of head lifetime on bias supply level and on head stripe temperature; and (b) setting a bias supply level for each head based on said dependence of lifetime on bias supply level and on head temperature, to essentially ensure the predetermined lifetime for the heads.

43. A disk drive comprising:

storage media for storing data, a magneto-resistive transducer head for writing data to and reading data from the storage media, a bias supply which provides a bias current to the transducer head, and a controller which controls the bias supply to provide a bias current to the head to essentially ensure a predetermined lifetime for the head.

44. The disk drive of claim 43, wherein the controller is configured to monitor head performance degradation and control the bias supply to adjust the bias supply level to achieve the predetermined lifetime.

45. A data storage device prepared for storage of data by the method of claim 1.

46. A data storage device prepared for storage of data by the method of claim 15.

47. A data storage device prepared for storage of data by the method of claim 27.

* * * * *